United States Patent
Ledet

(10) Patent No.: US 11,171,906 B1
(45) Date of Patent: Nov. 9, 2021

(54) APPLICATION DEPENDENT MESSAGING

(71) Applicant: OPEN INVENTION NETWORK LLC, Durham, NC (US)

(72) Inventor: David Gerard Ledet, Allen, TX (US)

(73) Assignee: OPEN INVENTION NETWORK LLC, Durham, NC (US)

( * ) Notice: Subject to any disclaimer, the term of this patent is extended or adjusted under 35 U.S.C. 154(b) by 0 days.

(21) Appl. No.: 16/055,449

(22) Filed: Aug. 6, 2018

Related U.S. Application Data

(63) Continuation of application No. 15/785,262, filed on Oct. 16, 2017.

(60) Provisional application No. 62/409,019, filed on Oct. 17, 2016.

(51) Int. Cl.
| | | |
|---|---|---|
| *G06F 15/16* | (2006.01) | |
| *H04L 12/58* | (2006.01) | |
| *G06F 16/951* | (2019.01) | |
| *G06F 3/0481* | (2013.01) | |

(52) U.S. Cl.
CPC ............ *H04L 51/22* (2013.01); *G06F 16/951* (2019.01); *H04L 51/08* (2013.01); *G06F 3/0481* (2013.01)

(58) Field of Classification Search
CPC ....... H04L 51/22; H04L 51/08; G06F 16/951; G06F 3/0481
USPC .......................................................... 709/206
See application file for complete search history.

(56) References Cited

U.S. PATENT DOCUMENTS

| | | | | |
|---|---|---|---|---|
| 5,859,898 A | * | 1/1999 | Checco | H04M 3/53 379/88.01 |
| 5,873,107 A | | 2/1999 | Borovoy et al. | |
| 5,920,562 A | * | 7/1999 | Christie | H04J 3/247 370/395.5 |
| 5,928,325 A | * | 7/1999 | Shaughnessy | G06Q 10/107 709/206 |
| 6,363,414 B1 | * | 3/2002 | Nicholls | G06Q 10/107 709/206 |
| 6,389,114 B1 | * | 5/2002 | Dowens | H04L 12/1813 379/100.09 |
| 6,438,748 B1 | * | 8/2002 | Gard | H04L 41/082 717/168 |
| 6,990,514 B1 | * | 1/2006 | Dodrill | H04L 51/066 709/206 |

(Continued)

OTHER PUBLICATIONS

Anonymous,Superuser, "Message with Drop-Down/Component", Jan. 2016, Internet—Superuser, https://superuser.com/questions/1027985/ message-with-drop-down-combobox, p. 1-5 (Year: 2016).

(Continued)

*Primary Examiner* — Melvin H Pollack

(57) ABSTRACT

An example operation may include one or more of receiving an incoming message on the at least one user device, determining the type of the at least one user device, determining a preferred message format from among a plurality of message formats supported by the selected user device, determining at least one recipient of the incoming message, generating a converted message by converting the incoming message to the preferred message format and in accordance with the at least one recipient's details, transmitting the converted message to the at least one user device, and transmitting the converted message to any other user devices in a message format pertaining to each particular recipient's details.

20 Claims, 11 Drawing Sheets

(56) References Cited

U.S. PATENT DOCUMENTS

| | | | | |
|---|---|---|---|---|
| 7,263,561 B1* | 8/2007 | Green | G06F 21/56 | 709/206 |
| 7,349,700 B1* | 3/2008 | Goldfinger | H04L 29/1216 | 370/277 |
| 7,825,901 B2* | 11/2010 | Potera | H04M 1/72552 | 345/171 |
| 7,903,639 B2* | 3/2011 | Foo | H04M 3/42382 | 370/352 |
| 8,200,258 B2* | 6/2012 | Yahav | H04L 51/066 | 455/466 |
| 8,286,085 B1 | 10/2012 | Denise | | |
| 8,391,136 B1* | 3/2013 | Eidelson | H04L 51/32 | 370/228 |
| 8,429,236 B2* | 4/2013 | Brown | H04L 47/323 | 709/206 |
| 8,577,422 B1 | 11/2013 | Ledet | | |
| 8,781,079 B2* | 7/2014 | Hao | H04M 3/53333 | 379/88.13 |
| 8,892,080 B2* | 11/2014 | Bolouri | G06Q 10/10 | 455/414.3 |
| 9,219,704 B2* | 12/2015 | Hamlin | G06N 5/025 | |
| 9,241,063 B2* | 1/2016 | Shih | G06F 16/24552 | |
| 9,336,674 B1 | 5/2016 | Thirumalaisamy | | |
| 9,338,597 B2* | 5/2016 | Abu-Hakima | H04W 4/90 | |
| 9,819,621 B2* | 11/2017 | Ghafourifar | H04L 51/16 | |
| 9,998,885 B2 | 6/2018 | Shelkovin et al. | | |
| 10,015,120 B2* | 7/2018 | Misra | G06F 16/9537 | |
| 10,038,735 B2* | 7/2018 | Majeti | G06Q 10/107 | |
| 10,063,710 B2* | 8/2018 | Feuer | H04M 7/125 | |
| 10,075,828 B2* | 9/2018 | Horton | H04L 12/2829 | |
| 10,122,665 B2* | 11/2018 | Beausoleil | H04L 51/22 | |
| 10,129,211 B2* | 11/2018 | Heath | G06Q 10/10 | |
| 10,216,709 B2* | 2/2019 | Lane | H04L 51/02 | |
| 10,332,085 B2* | 6/2019 | Attolini | H04L 51/32 | |
| 10,588,016 B2* | 3/2020 | Chen | H04W 12/47 | |
| 2002/0016818 A1 | 2/2002 | Kirani et al. | | |
| 2002/0059073 A1 | 5/2002 | Zondervan et al. | | |
| 2003/0184587 A1 | 10/2003 | Ording et al. | | |
| 2006/0055528 A1* | 3/2006 | Akamatsu | G08B 25/002 | 340/531 |
| 2006/0086799 A1 | 4/2006 | Robertson et al. | | |
| 2007/0043866 A1 | 2/2007 | Garbow et al. | | |
| 2007/0100942 A1 | 5/2007 | Lin et al. | | |
| 2007/0124376 A1* | 5/2007 | Greenwell | G06Q 10/107 | 709/204 |
| 2007/0180035 A1 | 8/2007 | Liu et al. | | |
| 2008/0028323 A1 | 1/2008 | Rosen et al. | | |
| 2008/0082678 A1* | 4/2008 | Lorch | H04M 1/72555 | 709/230 |
| 2008/0160960 A1 | 7/2008 | ElRif et al. | | |
| 2008/0270547 A1 | 10/2008 | Glickstien et al. | | |
| 2009/0019119 A1 | 1/2009 | Scheffler | | |
| 2009/0049139 A1 | 2/2009 | Fouotsop et al. | | |
| 2009/0106365 A1 | 4/2009 | Drory et al. | | |
| 2009/0172077 A1* | 7/2009 | Roxburgh | H04L 67/24 | 709/202 |
| 2009/0249226 A1 | 10/2009 | Manolescu et al. | | |
| 2009/0271486 A1* | 10/2009 | Ligh | G06F 3/04886 | 709/206 |
| 2010/0287183 A1 | 11/2010 | Kamireddy et al. | | |
| 2011/0071832 A1 | 3/2011 | Handa et al. | | |
| 2012/0148034 A1* | 6/2012 | Ferguson | G06Q 10/107 | 379/88.14 |
| 2012/0149404 A1* | 6/2012 | Beattie, Jr. | H04M 1/274508 | 455/466 |
| 2012/0209871 A1 | 8/2012 | Lai et al. | | |
| 2012/0226707 A1 | 9/2012 | Brun et al. | | |
| 2012/0303452 A1 | 11/2012 | Xue et al. | | |
| 2013/0080541 A1* | 3/2013 | Herbert | H04L 51/066 | 709/206 |
| 2013/0080545 A1 | 3/2013 | Datta | | |
| 2013/0097270 A1 | 4/2013 | Plotkin | | |
| 2013/0159830 A1* | 6/2013 | Lee | G06F 17/2241 | 715/208 |
| 2014/0201264 A1 | 7/2014 | Soon-Shiong | | |
| 2014/0201293 A1* | 7/2014 | Turakhia | H04L 51/04 | 709/206 |
| 2015/0052213 A1* | 2/2015 | Kau | H04L 51/14 | 709/207 |
| 2015/0089417 A1 | 3/2015 | Dayan | | |
| 2015/0248389 A1 | 9/2015 | Kahn et al. | | |
| 2015/0310072 A1 | 10/2015 | Dietz et al. | | |
| 2015/0381423 A1 | 12/2015 | Xiang | | |
| 2016/0099896 A1 | 4/2016 | Huang | | |
| 2016/0099903 A1 | 4/2016 | Dabney et al. | | |
| 2016/0127333 A1 | 5/2016 | Sood et al. | | |
| 2016/0149839 A1* | 5/2016 | Yi | H04L 67/1095 | 709/206 |
| 2016/0150433 A1 | 5/2016 | Bergquist et al. | | |
| 2016/0173424 A1 | 6/2016 | Fuhrmann | | |
| 2016/0212208 A1* | 7/2016 | Kulkarni | G06F 9/5072 | |
| 2016/0343062 A1 | 11/2016 | Morton et al. | | |
| 2017/0078232 A1 | 3/2017 | Faruk et al. | | |
| 2017/0093776 A1* | 3/2017 | Dixon | H04L 51/22 | |
| 2017/0104608 A1 | 4/2017 | Sergeev et al. | | |
| 2017/0118189 A1 | 4/2017 | Venkatakrishnan et al. | | |
| 2017/0134456 A1 | 5/2017 | McDonnell et al. | | |
| 2017/0249180 A1 | 8/2017 | Chen et al. | | |
| 2017/0286755 A1 | 10/2017 | Kaletsky | | |
| 2017/0331769 A1 | 11/2017 | Curry et al. | | |
| 2017/0345079 A1 | 11/2017 | Rangan et al. | | |
| 2017/0364866 A1 | 12/2017 | Steplyk et al. | | |
| 2018/0005289 A1 | 1/2018 | Angell et al. | | |
| 2018/0048595 A1* | 2/2018 | Dotan-Cohen | H04L 51/20 | |
| 2018/0048606 A1 | 2/2018 | Goslar | | |
| 2018/0241630 A1 | 8/2018 | Andrianov et al. | | |
| 2019/0014112 A1 | 1/2019 | Lacey et al. | | |
| 2019/0034451 A1 | 1/2019 | Nayak et al. | | |
| 2019/0044838 A1 | 2/2019 | Yao et al. | | |
| 2019/0253264 A1 | 8/2019 | Singaravelu et al. | | |
| 2019/0258796 A1 | 8/2019 | Paczkowski et al. | | |
| 2019/0260690 A1 | 8/2019 | Sun et al. | | |
| 2019/0266012 A1 | 8/2019 | Chou | | |
| 2019/0287146 A1 | 9/2019 | Maitland et al. | | |
| 2019/0288914 A1 | 9/2019 | Celozzi et al. | | |
| 2019/0334781 A1 | 10/2019 | Caldwell et al. | | |
| 2019/0349272 A1 | 11/2019 | Chou | | |
| 2019/0379728 A1 | 12/2019 | Hellstrom et al. | | |
| 2020/0028787 A1 | 1/2020 | Mehra et al. | | |
| 2020/0044919 A1 | 2/2020 | Yao et al. | | |
| 2020/0084131 A1 | 3/2020 | Bisht et al. | | |
| 2020/0104154 A1 | 4/2020 | Chou | | |

OTHER PUBLICATIONS

Libphonenumber, "Libphonenumber", internet, https://github.com/google/libphonenumber/releases/tag/libphonenumber-7.7.2, Oct. 11, 2016 (Year: 2016).

Stack Overflow, "EmojiconEditText is adding the emojis from the beginning", Internet, EmojiconEditText is adding the emojis from the beginning, Feb. 2016 (Year: 2016).

T. Ahmad, G. Sukanto, H. Studiawan, W. Wibisono and R. M. Ijtihadie, "Emoticon-based steganography for securing sensitive data," 2014 6th International Conference on Information Technology and Electrical Engineering (ICITEE), Yogyakarta, 2014, pp. 1-6. ( Year: 2014).

V. Iranmanesh, H. Jing Wei, S. Lee Dao-Ming and 0. A. Arigbabu, "On using emoticons and lingoes for hiding data in SMS," 2015 International Symposium on Technology Management and Emerging Technologies (ISTM ET), Langkawai Island, 2015, pp. 103-107. (Year: 2015).

Zhi-Hui Wang, The Due Kieu, Chin-Chen Chang and Ming-Chu Li, "Emoticon-based text steganography in chat," 2009 Asia-Pacific Conference on Computational Intelligence and Industrial Applications (PACIIA), Wuhan, 2009, pp. 457-460. (Year: 2009).

Joshi B. (2013) Event Handling. In: Beginning jQuery 2 for asp.net Developers. Apress, Berkeley, CA, Beginning Query 2 for asp.net Developers pp. 103-133; Jan. 4, 2014 (Year: 2014).

(56) References Cited

OTHER PUBLICATIONS

StackOverflow, "focus and focusout event order switching from one field to another", stackOverilow, "https://stackoverflow.com/questions/41553992/focus-and-focusout-event-order-switching-from-one-field-to-another", Internet, Jan. 2017 (Year: 2017).

StackOverflow,"Is it guaranteed that blur() event happens before the focus() when giving focus to a new element", stackOverfloow, https://stackoverflow.com/q uestions/20340091 /is-it-guaranteed-that-blur -event-happens-before-the-focus-when-giving-focus, Interview, Dec. 2013 (Year: 2013).

Anonymous, "Should I use POP3 or IMAP?" MSOutlook.info. Jul. 3, 2014. Accessed Apr. 14, 2021: https://www.msoutlook.info/question/815>. (Year: 2014).

* cited by examiner

APPLICATION DEPENDENT MESSAGING

CROSS REFERENCE TO RELATED APPLICATION

This application is a continuation of U.S. application Ser. No. 15/785,262, filed Oct. 16, 2017, entitled DATA INTERACTION WITH MESSAGES, which claims the benefit of U.S. Provisional Application No. 62/409,019, filed Oct. 17, 2016, entitled MESSAGING, the disclosure of which is incorporated in its entirety herein by reference.

FIELD

The current application generally relates to providing personalized user services for subscribed users and more particularly, relates to application dependent messaging.

BACKGROUND

In today's workplace, efficient communication with many different individuals or groups of people has become increasingly important and essential. Unfortunately, since everyone does not communicate via the same type of communication device, a single message intended for many different recipients often cannot be sent using a single mode of communication. Thus, to communicate with all the intended recipients, the message originator is forced to generate the same message many times using various modes of communication.

It would therefore be advantageous to provide a communication system that transmits a message generated by a message source to a variety of recipients communicating via diverse communication devices.

SUMMARY

Embodiments of the present invention provide systems, methods and computer program products of efficiently and reliably providing application/device based messaging.

Embodiments of the disclosure relate to a system providing personalized user services for subscribed users, including but not limited to message delivery redirect through active device awareness. The system monitors user applications and activity on those applications in order to provide services beneficial to the end user.

In other embodiments, the users' preferred application and current device is maintained in the system such that the system is aware of the current preferred application and may convert a message to a format of the current preferred application.

In other embodiments, a message in its original format may be delivered to a recipient if said recipient alters a preferred application that equals to the format of the original message, even after the original message was converted to a separate format prior.

In yet other embodiments, the system determines key points in messages of a conversation wherein keywords, key phrases, and/or key sentences are extracted. These keys are utilized to query related data in recipients' client devices such that the data is added to messages by the system.

In yet another embodiment, data may be added to a message, such as a document or link to a document either automatically by the system or added after the recipient provides verification.

Reference in the specification to one embodiment or an embodiment means that a particular feature, structure or characteristic described in connection with the embodiment is included in at least one embodiment of the invention. The appearance of the phrase "in one embodiment" in various places in the specification do not necessarily refer to the same embodiment.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

The system would automatically convert the message to the appropriate communication format and transmit the message to the selected recipients at their respective sites. In addition, the system would include an open architecture that advantageously could receive message from diverse sources, whether originated by users using a variety of user interfaces or originated by automated sources, such as other software applications or hardware devices. Furthermore, it would also be advantageous to provide a communication system that transmits recipient based delivery to various users, based upon each recipient's details and preferences.

One example embodiment may include a method comprising one or more of receiving an incoming message on the at least one user device, determining the type of the at least one user device; determining a preferred message format from among a plurality of message formats supported by the selected user device, generating a converted message by converting the incoming message to the preferred message format, attaching relevant addition data, in a file format, to the converted message, and transmitting the converted message to the at least one user device.

Another example embodiment may include a system comprising at-least one processor, and a software agent operated by the processor and configured to perform one or more of receive an incoming message on the at least one user device; determine the type of the at least one user device; determine a preferred message format from among a plurality of message formats supported by the selected user device; generate a converted message that converts the incoming message to the preferred message format; attach relevant addition data, in a file format, to the converted message; and transmit the converted message to the at least one user device.

Another example embodiment may include a non-transitory computer readable medium encoded with computer program instructions that when executed by one or more computers cause the one or more computers to perform one or more of receiving an incoming message on the at least one user device, determining the type of the at least one user device; determining a preferred message format from among a plurality of message formats supported by the selected user device, generating a converted message by converting the incoming message to the preferred message format, attaching relevant addition data, in a file format, to the converted message, and transmitting the converted message to the at least one user device.

Another example embodiment may include a method comprising one or more of receiving an incoming message on the at least one user device, determining the type of the at least one user device, determining a preferred message format from among a plurality of message formats supported by the selected user device, determining at least one recipient of the incoming message, generating a converted message by converting the incoming message to the preferred message format and in accordance with the at least one recipient's details, transmitting the converted message to the at least one user device, and transmitting the converted message to any other user devices in a message format pertaining to each particular recipient's details.

Another example embodiment may include a system comprising at-least one processor, and a software agent operated by the processor and configured to perform one or more of receive an incoming message on the at least one user device, determine the type of the at least one user device, determine a preferred message format from among a plurality of message formats supported by the selected user device, determine at least one recipient of the incoming message, generate a converted message that converts the incoming message to the preferred message format and in accordance with the at least one recipient details, transmit the converted message to the at least one user device, and transmit the converted message to any other user devices in a message format that pertains to each particular recipient's details.

Another example embodiment may include a non-transitory computer readable medium encoded with computer program instructions that when executed by one or more computers cause the one or more computers to perform one or more of receiving an incoming message on the at least one user device, determining the type of the at least one user device, determining a preferred message format from among a plurality of message formats supported by the selected user device, determining at least one recipient of the incoming message, generating a converted message by converting the incoming message to the preferred message format and in accordance with the at least one recipient details, transmitting the converted message to the at least one user device, and transmitting the converted message to any other user devices in a message format pertaining to each particular recipient's details.

The present invention will now be described with reference to the following drawings, in which like reference numbers denote the same element throughout.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Embodiments of the present invention are described herein in the context of a system of computers, servers, and software. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure. In addition, anywhere the word user appears, it means the user client device(s), the user device(s), and/or any device containing a memory and processor interacted with in some fashion by the user.

Anywhere the word user appears, it means the user client device(s), the user device(s), and/or any device containing a memory and processor interacted with in some fashion by the user.

Figure 1:
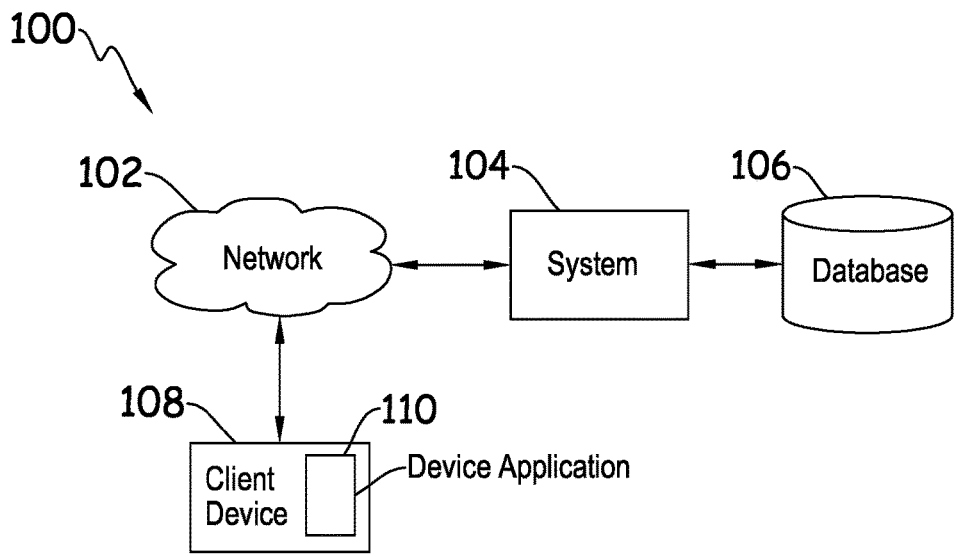
FIG. 1 is a block diagram of a system environment in accordance with an embodiment of the present invention.

Referring now to the figures, FIG. 1 displays a system 100 of the present invention, in one embodiment. The present invention, in the form of software for example 110, executes on a device 108, or is accessible by the device 108 in a network 102 and/or a device communicably coupled to the network, such as system 104 and database 106. The device 108 may be a mobile device, a tablet computer, a laptop or desktop computer, a transport navigational computer, a wearable device, or any other similar or dissimilar device containing a processor and memory. It may also be a gaming system, a DVD player, or any device that is normally utilized to consume media. Or the present invention, in the form of software, for example may reside on the device 108 that may be any of a mobile laptop device and/or a personal desktop computer, a wearable device, a mobile device or any other device containing a processor and memory. The device may be connected to the network 102 (which may be the Internet or any other type of network).

In some embodiments, there may exist multiple client devices 108, and may be directly connected to the system 104.

The system 104 may be a server computer or any similar type of device containing a memory and processor and directly or remotely connected to the network, or Internet 102. There may be a database 106 that also may be directly connected to the system 104 and/or the network 102.

In other embodiments, all or part of the software of the current application may reside on the client device(s) 108, the system 104, the database 106, and/or on another element of the system containing a processor and memory (not depicted) either directly connected to the shown elements of the system, or connected through the network 102 wherein messaging to and from the said elements are routed through the network.

Any element described or depicted herein can constitute more than one like element. For example, server 104 can constitute multiple servers. In addition, the system may exist entirely or in part in any of the elements in the system diagram, for example the client device 108.

User Subscription

The system maintains a database of registered users, which may reside in database 106, which is added to and managed using a self-subscription procedure. This database may reside in the client device 108 wherein internal, device-specific messaging occurs between the current application 110 and the device 108, or reside in the system 104, or the database 106.

Through this self-subscription procedure, a user signs up for the services provided by the system, the self-subscription procedure being located in the device application 110, in one embodiment. Each record for a registered user contains basic user credentials consisting of a user ID and password as well as additional service related details that are configured for each user including but not limited to active email address(es) (representing email applications) and mobile service number(s) (representing various applications on a mobile device). The user subscription is self-managed allowing each user to modify their list of registered applications.

The data stored for users of the system includes identification elements of the user and may be added/deleted/modified via normal functionality used to store and edit data via an application on a device 108 through the interaction of the data, which may be stored either locally in the device 108, or in an external database, such as database 106.

As either part of the self-subscription procedure, or as a separate module, there exists a configuration module in the current application executing on a client device 108 wherein the specific configurable elements are displayed and are able to be maintained therein.

For example, the preferred application per device is configured at the configuration module of the current client device 108. As such, components on the display of the client device executing the configuration module allows for the selection of preferred applications per device. As an example, please look at FIG. 2.

Figure 2:
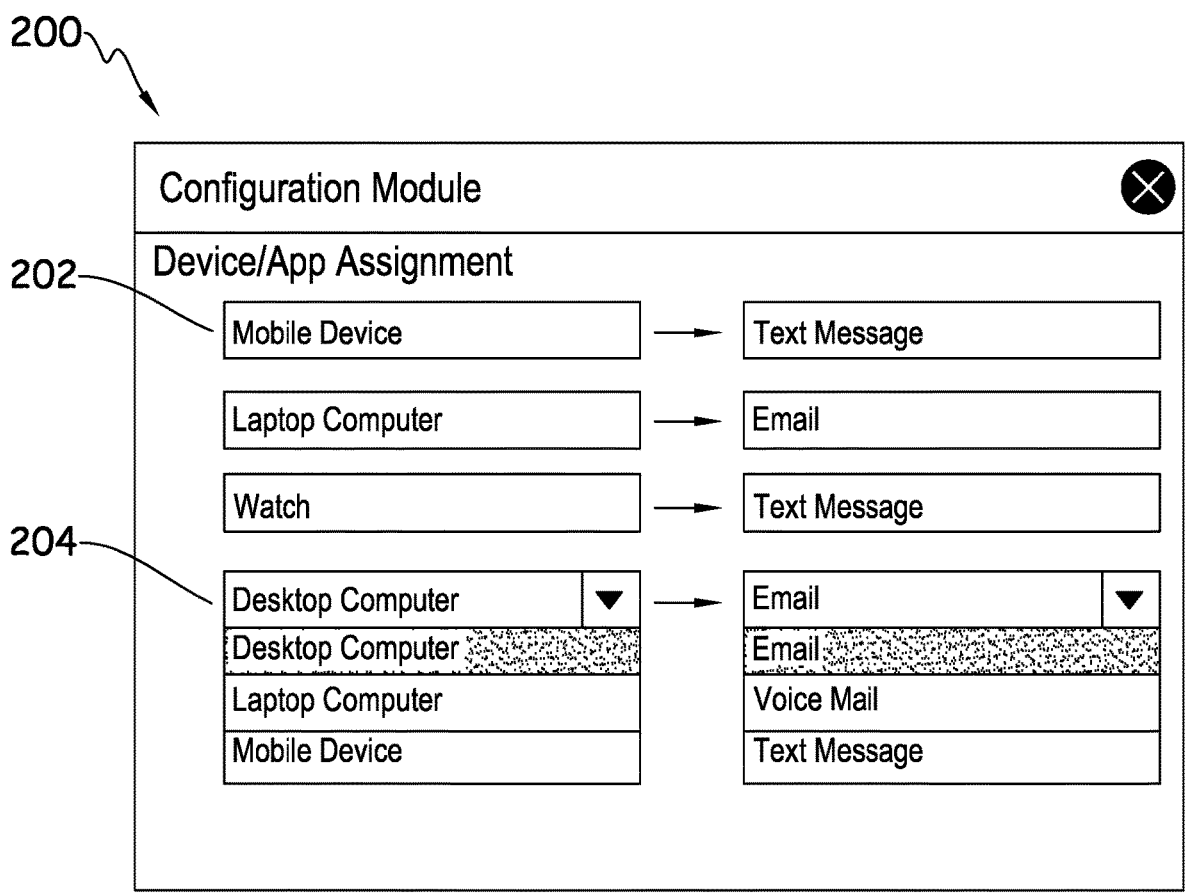
FIG. 2 is a block diagram illustrating a GUI Configuration module in accordance with an embodiment of the present invention.

FIG. 2 is an GUI shot of the configuration module in one implementation of the current application 200 executing on the client device 108. The GUI shot depicts the configuration option for the device/app assignment. Other elements may be configured using various GUI components wherein other elements may be configured in a similar manner.

The GUI shot 200 depicts three configured elements 202 and one element that are in the process of being configured 204. The configured elements show that when the client device is a mobile device, the preferred application is text messaging. When the client device is a laptop computer, the preferred application is email, and when the client device is a watch, the preferred application is text messaging.

Dropdown components 204 are utilized to select the device and the corresponding assignment of application. Other GUI components may be utilized to allow the selection of the application assignment to a selected device without deviating from the scope of the current application.

User Application Management

Services provided by the system 104 monitors user applications for notifications and activity. Applications may be identified as software applications such as email, messaging, or social media applications, or they may be identified as devices such as mobile or tablet devices. For mobile devices and tablets, the system 104 provides an optional per device application that is used to monitor the activity of the device(s) and various other software applications on each device. Through this system device application, the user applications may be auto-discovered to monitor and use for system communications.

The user may manually configure other applications via a configuration module of the current application executing on the client device 108 wherein messaging occurs between the client device and the system 104. Once discovered or manually configured, additional application details (such as user credentials) are also configured for the user, along with the preferred application communication precedence order. The user may also disable applications to monitor and use for system communications through their configuration view 200.

Maintaining a Record of a User's Activity

The system 104 monitors the applications 110 as identified for the user, the monitoring for activity being achieved depending on the specific application.

As an example, for an email application the user may remain logged into their email server using email applications on multiple devices, so the system 104 monitors the users' IMAP email server and tracks if an incoming email message has been read within a specific time period.

In one embodiment, to track the reading of emails, the system 104 adds an image file which is altered with $_GET parameters and logs the user into a database, then serves up an actual image. For example:

<img alt=" " src="http://awebsite.com/record.php?user= youremail@email.com&message=19"width="1" height="1" border="0"/>

At the system 104, a record is inserted into a database with the user name and the subject of the email being stored:

```
if($exist_count=0)
{
  //Make an array of columns=>data
  $insert_record=array(
    'user'=>$user,
    'subject'=>$subject
  );
  //Insert the information into the email_log table
  $database->insert('email_log', $insert_record);
}
```

Finally, the system 104 code sends back an image to the email client, to avoid any client errors with the interaction. The image returned is entitled blank.gif, and is a 1 px×1 px (1×1 pixel) transparent gif:

//Full URI to the image
$graphic_http='http://yourwebsite.com/blank.gif';

```
//Get the filesize of the image for headers
$filesize=filesize('blank.gif');
//Now actually output the image requested (intentionally
   disregarding if the database was affected)
header('Pragma: public');
header('Expires: 0');
header('Cache-Control: must-revalidate, post-check=0, pre-
   check=0');
header('Cache-Control: private',false);
header('Content-Disposition:           attachment;
   filename="blank.gif"');
header('Content-Transfer-Encoding: binary');
header('Content-Length:'.$filesize);
readfile($graphic_http);
```

Other methods of tracking the opening of emails is possible, and one versed in the programming techniques of current email applications may implement other methods without deviating from the scope of the current application.

As a further example, for a mobile device 108 messaging or social media application the system device monitoring application detects the activity of an incoming message or notification and if it has been read or not by the user. When the user reads/processes the incoming message or notification, the system records and keeps track of which device and application the user used, and how quickly the user responded to the incoming activity.

In one embodiment, a timer is started at the system 104 when a message is delivered, and when the timer expires if the message has not been opened or responded to, further functionality may proceed, further depicted herein. This timer may be configured in the configuration module of the current application, see the section entitled "User Subscription"

Knowing the active device and the frequency of application use of the user allows the system to send additional data reflecting other unread or unprocessed activity.

System Establishing the Communication Protocol

In conjunction with user configuration details, the system 104 uses device and application monitoring to determine the preferred communication method such that the system may send the communication in a format that matches the preferred message format of the current application executing on the device 108.

To obtain the device-type of a user, it is normal to check the header of an HTTP request received at a server. In this header, it is possible to obtain the browser being used in the "User-Agent" field. The User-Agent will contain the operating system that the user is on (mobile or non-mobile), as well as the browser information.

If the user is utilizing Javascript, then the navigator object is used:
   navigator.userAgent( );
   If using PHP, the following code will access the HTTP header:
   $userAgent=$_SERVER["HTTP_USER_AGENT"];

In one embodiment, the current application 110 executing on a client device 108 records the initialization of the application on the system 104. The application may be executed either automatically upon initialization of the operating system, or manually initiated by the user.

The initialization of the application may also be executed upon user interaction with the device 108. This may be during waking from a sleep mode, logging into the device, initialization of the operating system, etc.

Upon initialization of the application 110 executing on the client device 108, sends an activity message to the system 104 wherein the system stores the data either locally or at a remote database 106.

The activity message contains:
a. The userID of the user on the device
b. The device-type of the device sending the message As an example, javascript may be used to send data to a server:
```
$.post("userDeviceData.asp",
   {
      name: user.emailAddress,
      device: user.deviceType
   }
   function(data, status){
      alert("Data:"+data+"\nStatus:"+status);
   });
```
The javascript code sends two data elements to the server: the emailAddress and deviceType of the user object.

The server code receives the POST and processes the sent data. The data can then be stored in a database.
```
<%
dim emailAddress, deviceType
emailAddress=Request.Form("name")
deviceType=Request.Form("device")
%>
```
On the system 104, the variable "emailAddress" contains the user's email address, and the variable "deviceType" contains the device that the user is currently using.

These data elements may then be stored in a database 106 or stored locally in the system 104.

Through auto-discovery, frequency of use, or manual configuration override the preferred application is established per device and noted in the configuration area for the user. The preferred application choices include:
a. Email
b. Instant message
c. Text message
d. Voice mail
e. Social Media (e.g. Facebook Messenger)

Note that some monitored applications may not be used for system communications.

System Converts Data Based on Active Device/Application

The system 104, understanding the user's active device 108 and application 110, may convert an incoming message or notification for said application. For example, if the original message is an email, a summary of the email may be determined wherein a text message of the summary is sent to the recipient if the recipient's preferred application is text-message.

The current incoming message is potentially converted at the System 104 where the system accesses the user subscription to obtain the preferred application for the user's current device 108. If the preferred application does not match the current message type, the message is converted prior to delivery to the recipient(s). The conversion process is further disclosed herein.

In the figure below, the current state of the client devices of the users are depicted below by the arrows 330 and 332 wherein the preferred application along with the current device is shown along a timeline that moves downward.

Messages may be routed through the network 104 between the devices 308 and the system 306, and is not depicted herein.

Figure 3:
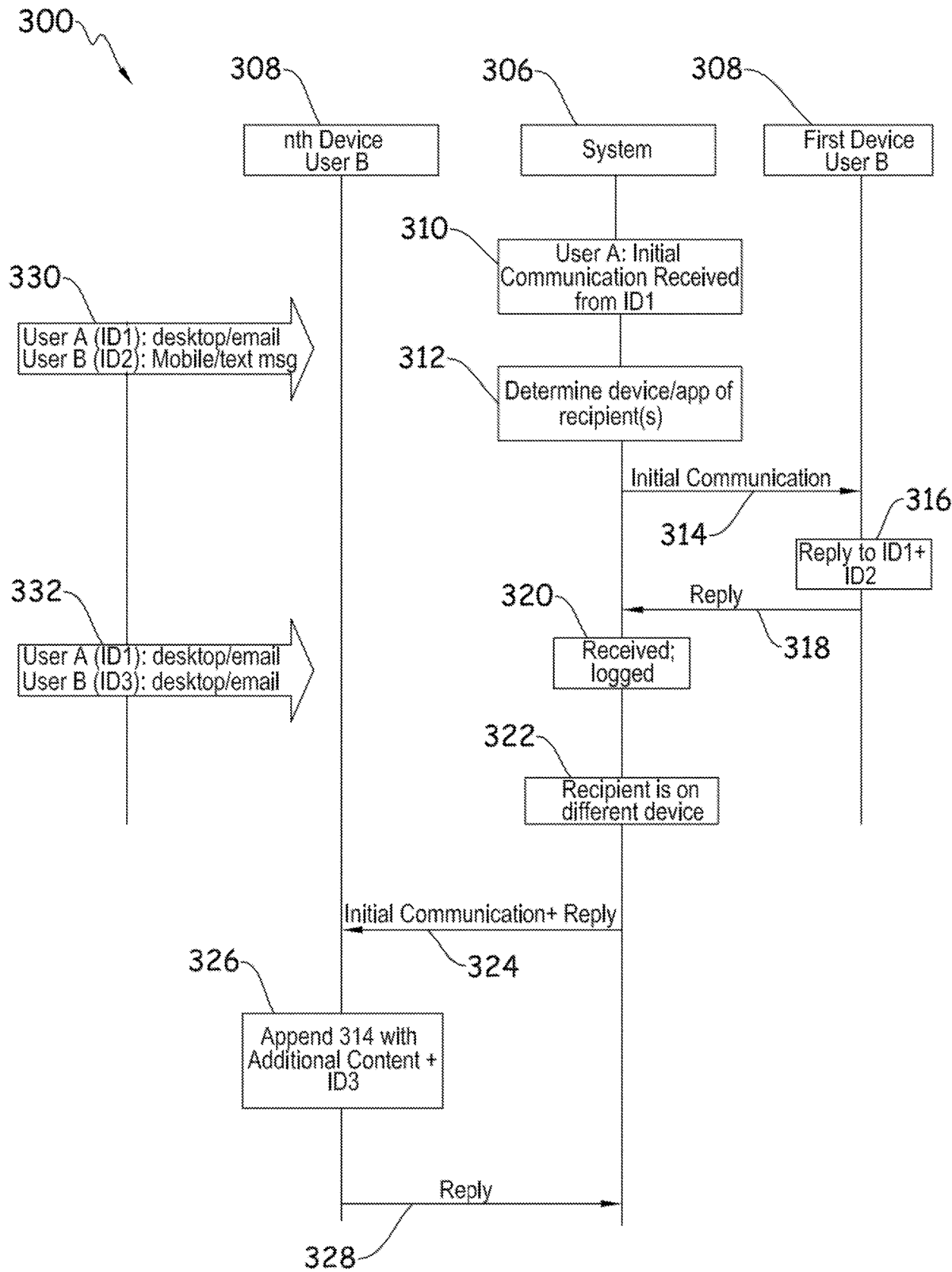
FIG. 3 is a diagrammatic view depicting an implementation of an embodiment of the present invention.

FIG. 3 shows one implementation of the current application 300 where an incoming message is converted to an alternate format based on the preferred application of the recipient.

A message 310 is received at the system 306. The originator of the message is the client device of User A. An ID of the originator, referred to as "ID1", is stored to by the system wherein the communication may be tracked via this identification. In one embodiment, the identification of the user on the device (ID1) is appended to the outgoing message. We can see that the current device/app of the originator (User A) is desktop/email 330. The current device of the recipient of the message (User B) 308 is mobile/text message per 330.

The system first determines the preferred application of messages 312. User B is currently on a mobile device, and the preferred application is text messaging; therefore the current message (which is an email) is converted to text message. Further details of the conversion is further disclosed herein.

The message 314 is sent to the client device of the recipient 308, the message having been converted to a text message. In some embodiments, the entire message is not delivered, but a summary of the message wherein only the key words and/or the key phrases and/or the key sentence(s) are sent.

The client device 308 receives the message 314 via the normal text messaging application. A reply 318 is sent back to ID1 with the identification of the recipient on the mobile device is appended (ID2) 316.

The reply message 318 is received at the system 304 and logged 320 (the current message along with the appended identification of the user/device (ID2) is stored in either local storage and/or remote storage, such as a database 106.

The system is notified of a device change for the recipient 322 by the user logging into a client device wherein the system 306 is made aware of via an activity message containing the user's identification and the device type. User B is now active on a desktop computer wherein the preferred application is email 332.

The system accesses the communication between the originator (User A) and the recipient (User B), which is stored in the system locally 306, or an external database, for example. The system, having been notified that the recipient (User B) is on a different device that has email as the preferred application sends the original message (in the email format), along with the reply to the recipient (User B) 324.

Finally, the recipient (User B) responds to the message—now being able to read the original message (email) in its entirety 326. This reply is added to the initial communication 314, the reply 318, plus the reply, which is sent to the system 328 and finally delivered to the originator (User A), not depicted.

Message Conversion

Messages are converted, potentially, based on the current/active device of the recipient(s) at the server 104. For example, if the original message is an email and the recipient is on a mobile device wherein the preferred device is text message, the email is converted to a text message.

In one embodiment, the text of the email is placed in the body of the text messages wherein the text message contains all the portions of the original email.

For example, if the original email contains:
To: User B
From: User A
Subject: Project Plan Meeting
Body: Hey Bob, the meeting time has been changed to Friday at 1 pm. Let me know if you are able to make it. Thanks, John.

The corresponding text message contains:
Subject: Project Plan Meeting Body: Hey Bob, the meeting time has been changed to Friday at 1 pm. Let me know if you are able to make it. Thanks, John.

Figure 4:
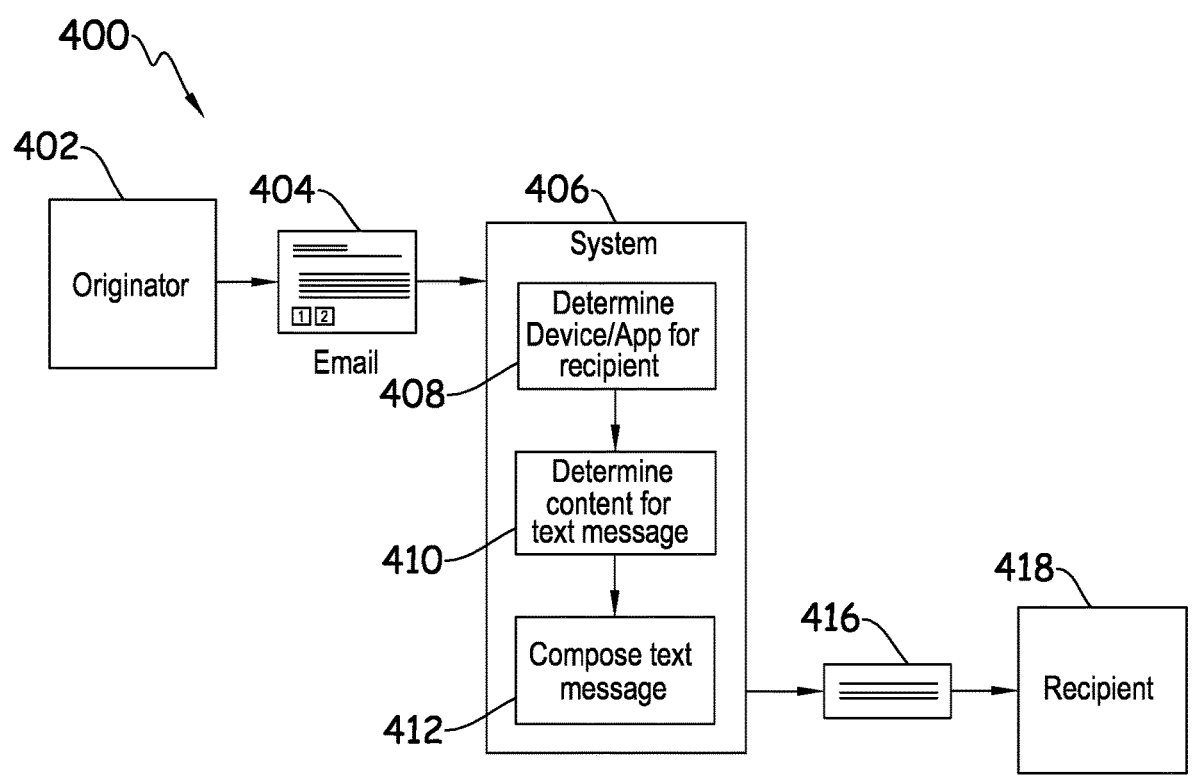
FIG. 4 is a diagrammatic view depicting another implementation of an embodiment of the present invention as pertaining to the conversion of messages.

FIG. 4 is a flowchart showing the conversion of messages in the system 406, in one implementation of the current application 400. An originator 402 begins the process wherein a user, utilizing the application on a client device for example a desktop or laptop computer sends an email to a recipient 404. This email is routed to the system 406 where the message is received for processing.

The system first determines the current preferred application for the recipient(s) of the message 408. This is stored either in the local storage or remotely in a database. The method of detecting the device and preferred application is further discussed herein.

If the recipient's preferred application is text message, the original message (Email 404) is converted to a text message 410 wherein the details of this conversion is further discussed herein. Finally, the system 406 generates a text message with the keyword(s)/key phrase(s)/key sentence(s) of the original message 412, and sends the text message 416 to the recipient(s) 418.

In one embodiment, the main parts of the body of the email are analyzed 410. This process utilizes Natural Language Processing (NLP), and analysis tools such as a text content and keyword analyzer wherein the main sentences and keywords are extracted from text. For example, the Hatmandu application analyzes text and pulls the most important words, as well as the most important sentences, in terms of the text's themes.

Figure 5:
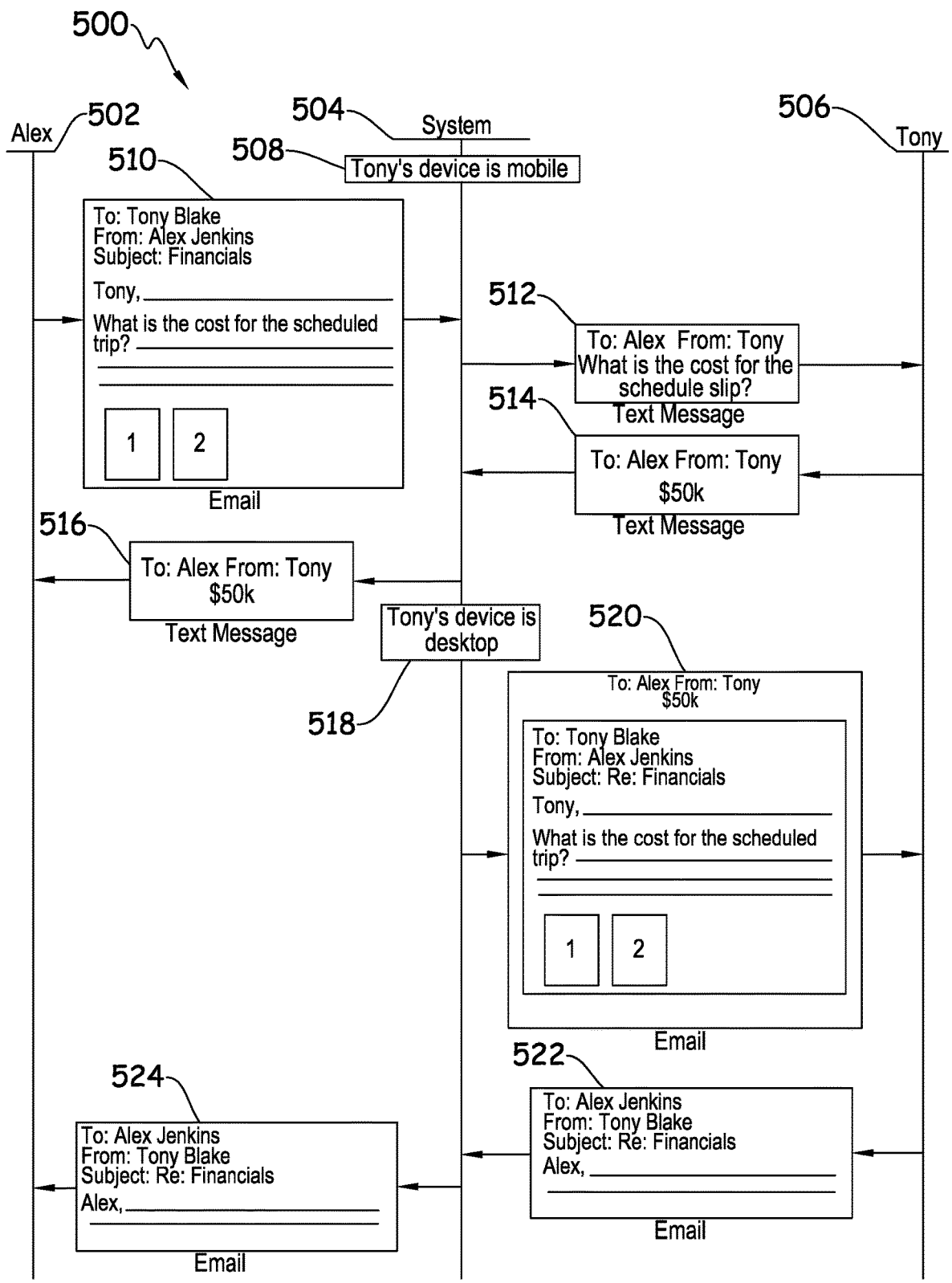
FIG. 5 illustrates a message flow in accordance with an embodiment of the current invention.

FIG. 5 is a message flow of one implementation of the current application showing the flow of messages between two users routed through the system 500.

The current state of the uses is provided, showing the current device of the user and the preferred application or that device 508.

A message 510, in this example an email, is sent from the originator, Alex 502, with Tony as the recipient 506. For the simplicity of the diagram, the email message 510 is summarized, showing the common fields present in an email. The body of the email 510 shows the main sentence, "What is the cost for the schedule slip". The email also has two attachments.

The message is received at the system 504 where it is converted to a text message 512, according to the device and preferred application of the recipient—further disclosed herein. The text message contains the main sentence in the email, "What is the cost of the schedule slip?"

Tony responds to the text message, "$50k" 514. This message is received at the system and forwarded 516 to the originator, Alex 502.

The system is notified of a change in the recipient's device and preferred application 518. The recipient's device is now desktop wherein the preferred application is email.

The system, acknowledging that the recipient is on email, sends the original message (email) to the recipient 520.

In an alternate embodiment, the response to the message (514) is added to the original email 520, allowing the recipient to be made aware of the original message and the previous response sent.

In another embodiment, message 516 could bean email, a text message or a message that is based on the originally message type, or according to the currently utilized message application.

In yet another embodiment, if message 516 is email, the system may append to the email documents from either its storage access or the access of the recipient's storage one or more documents pertaining to the topic of the email.

The recipient may then respond to the original email by sending an email response 522, which is forwarded by the system to the originator 524.

System Interacting With Recipient(s) Data

In another embodiment, the system may add data to a message automatically wherein the recipient's data is utilized to provide at least one additional element and/or modification to the message.

Figure 6:
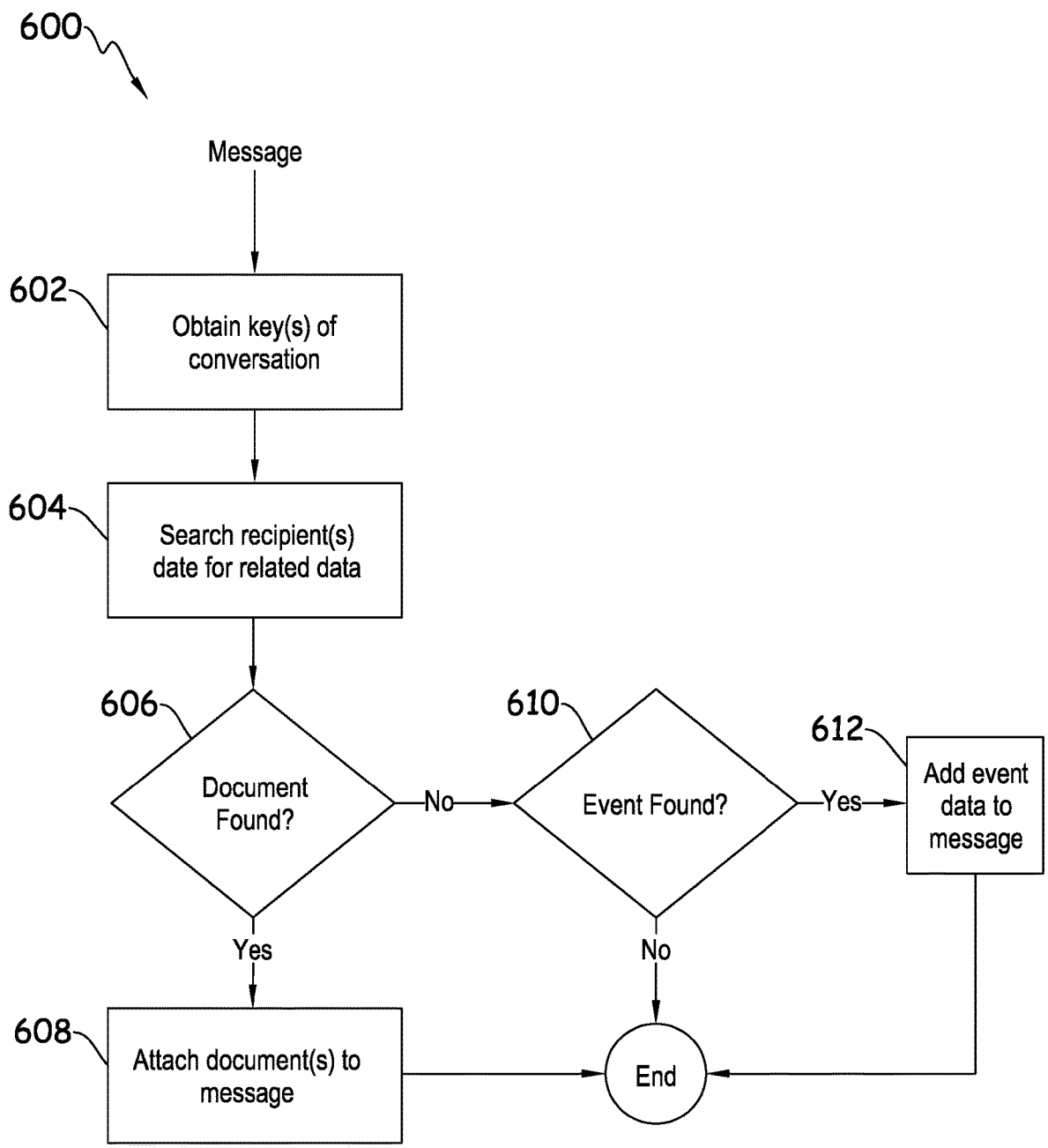
FIG. 6 is a flow chart illustrating the process of the system adding data.

FIG. 6 shows a flowchart in one implementation of the current application showing the system adding data to an outgoing message 600.

A message from either the originator of the conversation or the recipient(s) is received at the system. The system either determines the keyword(s), key phrases(s), and/or key sentence(s) of at least one of the messages in the conversation 602. The process of determining the key elements in the message is further disclosed herein in FIG. 7.

In another embodiment, the tool Natural Language Toolkit (NLTK) is utilized to perform analysis on an original message to determine keyword(s), key phrase(s), and/or key sentence(s). NLTK provides a pool of language processing tools written in the Python language, including data mining, machine learning, data scraping, sentiment analysis and other various language processing tasks.

Figure 7:
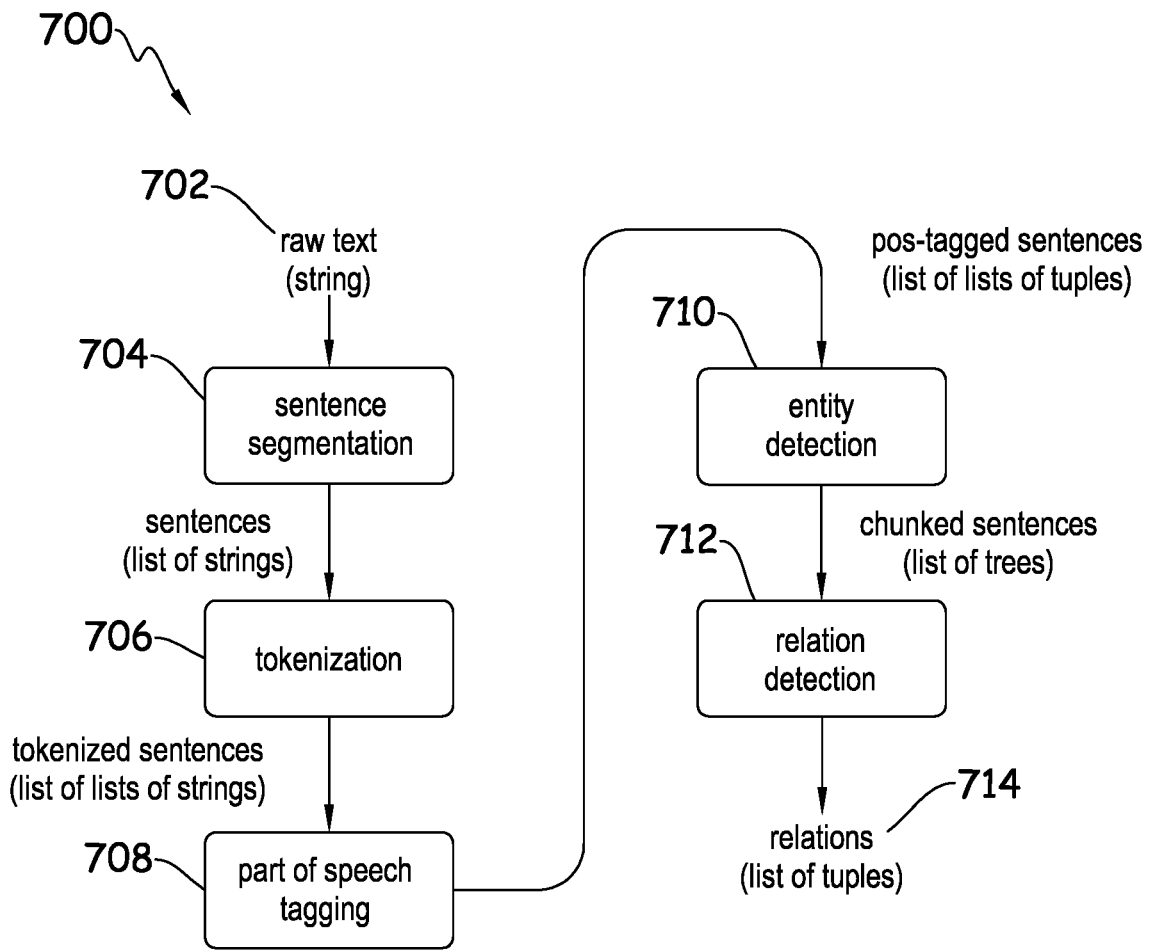
FIG. 7 depicts a flow chart illustrating the processing of the NLTK tool.

FIG. 7 is a flow of processing for the NLTK tool 700. Raw text 702 is used as input, for example the original message. The raw text is first split into sentences, a process called sentence segmentation 704. The next process is tokenization, 706 where all words in the sentences are split into words where each word is a separate string. This is the most basic natural language processing technique. The parts of speech 708 are then determined, followed by entity detection 710, where a search for mentions of potentially interesting entities in each sentence is performed. Finally, relation detection 712 is performed where the elements are searched for likely relations 714 between different entities in the text.

A search is performed on the recipient(s) data; wherein the data may reside on the user's client device 108 and/or the user's remote data located on a remote database 106, and/or data residing in the network 102. The key(s) determined in 602, as shown in FIG. 6, are used in the comparison such that the data is matched against the key(s) 602.

Figure 8:
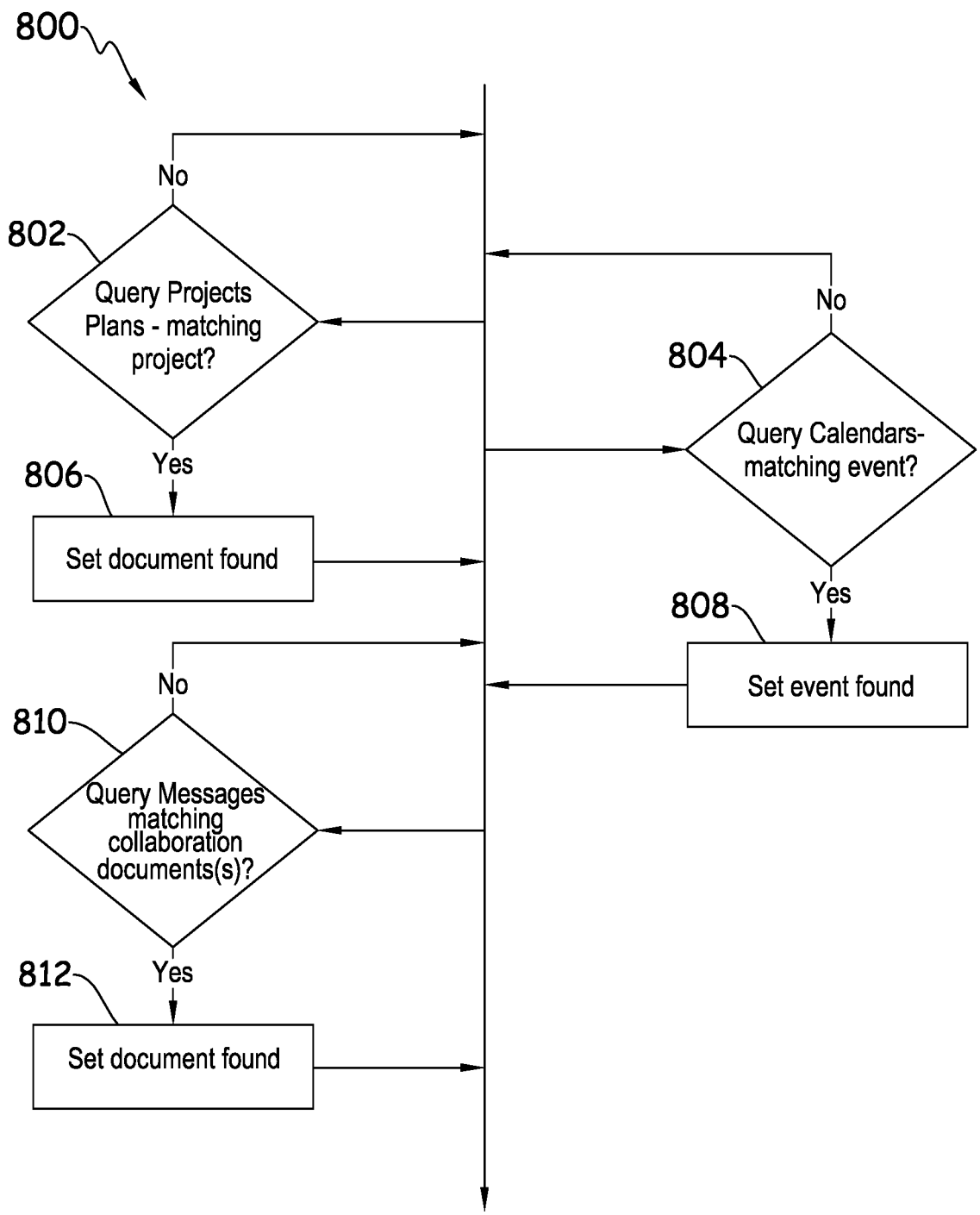
FIG. 8 depicts a flowchart of the system searching for related data.

FIG. 8 depicts the implementation to search for related data 604, as shown in FIG. 6. FIG. 8 shows a more detailed flow 800 of the processing of determined keywords determined in FIG. 6, 602 at the system.

Of note is the functional flow of the processing of the keys of the conversation. The processing of the data is depicted such that the querying of project plans 802 is processed first, followed by the querying of the calendar(s) 804, and finally the query matching collaboration document(s) 810. It should be considered that the processing of the specific areas might be processed in any order as indicated by the "bus" wherein each of the processes are originated.

In another embodiment, other functionalities may be designed wherein the originator and recipient(s) data are compared without deviating from the scope of the current application. For example, the originator's data and the recipient(s) data may be used to query other applications either within the enterprise environment and/or outside of the enterprise environment. For example, software development applications such as code repositories, document repositories, etc. As another example, message applications such as email applications, may be queried to determine previously exchanged messages between the two parties.

A project plan application or database is queried 802 using the originator's data and/or the recipient(s)' data. The system 104 obtains access to users of the system, as well as specific projects inside the organization, for example the enterprise environment. This access may be internal to the organization, such as an intranet, or via access to an external server and/or database wherein communication occurs through a network 102. This occurs via interaction with an organization's project planning software via access Application Programming Interfaces (APIs), for example.

In one embodiment, the project planning data (such as in a database) may be queried using a database query language, such as Structured Query Language (SQL). For example, projects may be queried wherein the originator's data and the recipient(s)' data is searched to determine if any of the projects contain both the originator and recipient(s).

If there are one or more projects containing both the originator and recipient(s), the current project data file is stored at the system 104 for later use 806. If there are no matches found, then the processing continues.

Calendar data is queried 804 using the originator's data and the recipient(s)' data. The system 104 obtains access to users of the system, as well as calendar/event data inside the organization, for example the enterprise environment. This access may be internal to the organization, such as an intranet, or via access to an external server and/or database wherein communication occurs through a network 102. This occurs via interaction with an organization's calendar/event data via access Application Programming Interfaces (APIs), for example.

In one embodiment, the calendar data (such as in a database) may be queried using a database query language, such as Structured Query Language (SQL). For example, calendar/event data may be queried wherein the originator's data and the recipient(s)' data is searched to determine if any of the calendar/event data contain both the originator and recipient(s).

For example, to search calendar/event data, the Java code below using the Google Calendar API shows retrieving events in a user's calendar application:

```
import com.google.api.services.calendar.Calendar;
import com.google.api.services.calendar.model.Event;
// . . .
// Initialize Calendar service with valid OAuth credentials
Calendar service=new Calendar.Builder(httpTransport,
    jsonFactory, credentials) .setApplicationName("applica-
    tionName").build( );
// Retrieve an event
Event event=service.events( ).get('primary', "eventId").ex-
    ecute( );
```

The event returned is of type "Event", containing the specific details of the event. Including in the Event data is an attendee array:

```
"attendees": [
    {
        "id": string,
        "email": string,
        "displayName": string,
        "organizer": boolean,
        "self": boolean,
```

"resource": boolean,
"optional": boolean,
"responseStatus": string,
"comment": string,
"additionalGuests": integer The attendee array above is part of the data returned in the Event data. The Event data will contain an array with all of the attendees in the event, along with details of each attendee including the email and name.

The Event data also contains the event's creator data including the creator's email and name.

The current application obtains calendar events by utilizing the code above or Google calendar API in the system 104 of the originator and the events of the recipient(s). This is the event(s) that either of them has created. Using the returned Event data, it then determines if any of the events created contain the other user's name or email. If there is a match, this means that the originator and the recipient(s) share an event, and this event data is stored at the system 104 for later use 808. If there are no matches found, then the processing continues.

Documents are searched for the originator and/or the recipient(s) 810. These documents may be located in the user's local file system, or may be located remotely in a database wherein queries are routed through a network 104.

For example, the attributes of the documents are obtained via an API. Documents stored in the cloud may be queried wherein the attributes of each of the files are returned.

Once a file is obtained, a call to getEditors( ) returns the users whom have access to edit the file. In the code below, once the file is obtained, a call to getEditors( ) returns the editors of the file.

/ Log the email address of all users who have edit access to a file.
var file=DriveApp.getFileById('1234567890abcdefghijklmnopqrstuvwxyz');
var editors=file.getEditors( );
for (var i=0; i<editors.length; i++) {
Logger.log(editors[i].getEmail( ));

The code above stores access to a file via a string that has been determined beforehand. This calculation of the string is not depicted, but is determined by the current application obtaining access to the user's file system either locally to the client device, or remotely wherein communication occurs between the client device and a remote database through the network 110.

The method getEditors( ) is called on the obtained file and stored in the variable "editors". This contains all of the details of the users who retain editable access to the file. There exist methods that are available wherein details of each of the editor's information are available:

getDomain( ) Gets the domain name associated with the user's account
getEmail( ) gets the user's email address
getName( ) gets the user's name
getPhotoUrl-gets the URL for the user's photo The emails of each of the editors are obtained by looping through the returned editors wherein a call to getEmail( ) obtains the email address of each of the editors of the file.

The editors of the files are obtained and compared to determine if the originator is an editor of the recipient's files, or the recipient(s) is/are an editor of the originator's files.

In one embodiment, the files within a determined timeframe are searched; therefore not all files are searched, but only those that are recent in time.

In another embodiment, both the files of the originator and the files of the recipient(s)' files are obtained. After the editor(s) of the files are obtained, the editors are searched to determine if either the originator is an editor of the recipient(s)' files and/or the recipient(s) are editors of the originator's files.

If there are one or more files wherein the originator is an editor of the recipient(s)' files or the recipient(s) are editors of the originator's files, the files and/or links to the files are stored at the system 104 for later use 812.

In another embodiment, a maximum number of matching files and/or links to matching files are returned in the response message, for example 5. If there are no matches found, then the processing continues.

In another embodiment, other elements may be determined (not depicted) wherein the system 104 may compare data against the incoming query message(s). For example, previous messages may be returned wherein the originator and recipient(s) have previously communicated, other data files such as images, documents, video, etc. files may be returned wherein both the originator and recipient(s) have collaborated or otherwise communicated about, and other types of data without deviating from the scope of the current application.

Referring to FIG. 6 again, if file document(s) are found 606, the file is attached to the message 608 and the process ends. If not, then the search seeks to locate matching calendar event(s) 610. If a matching event is found, the data is added to the text of the message 612 and the process ends. For example, the text of the event is added to the end of the message.

For example, to append text to the body of an email in Microsoft Outlook, the syntax for appending text to a variable:
strMyText—strMyText & vbCrLf & "another line of text"

The "&" operator is used to concatenate one string with another. vbCrLf is an intrinsic constant that represents the carriage return/line feed characters.

So, to append text to MyItem.Body, the structure of the statement would be identical:
MyItem.Body=MyItem.Body & vbCrLf & dPath In other embodiments, the event data may be added to the message in other formats, for example the calendar event object may be added to the outgoing message.

In another embodiment, the order of the searching may differ that what is depicted. Other matching data may be programmed without deviating from the scope of the current application.

Attaching Data to Message

Data related to a conversation may be sought by the system and either automatically added to an outgoing message, or added when verified by a user, in one embodiment of the current application.

Figure 9:
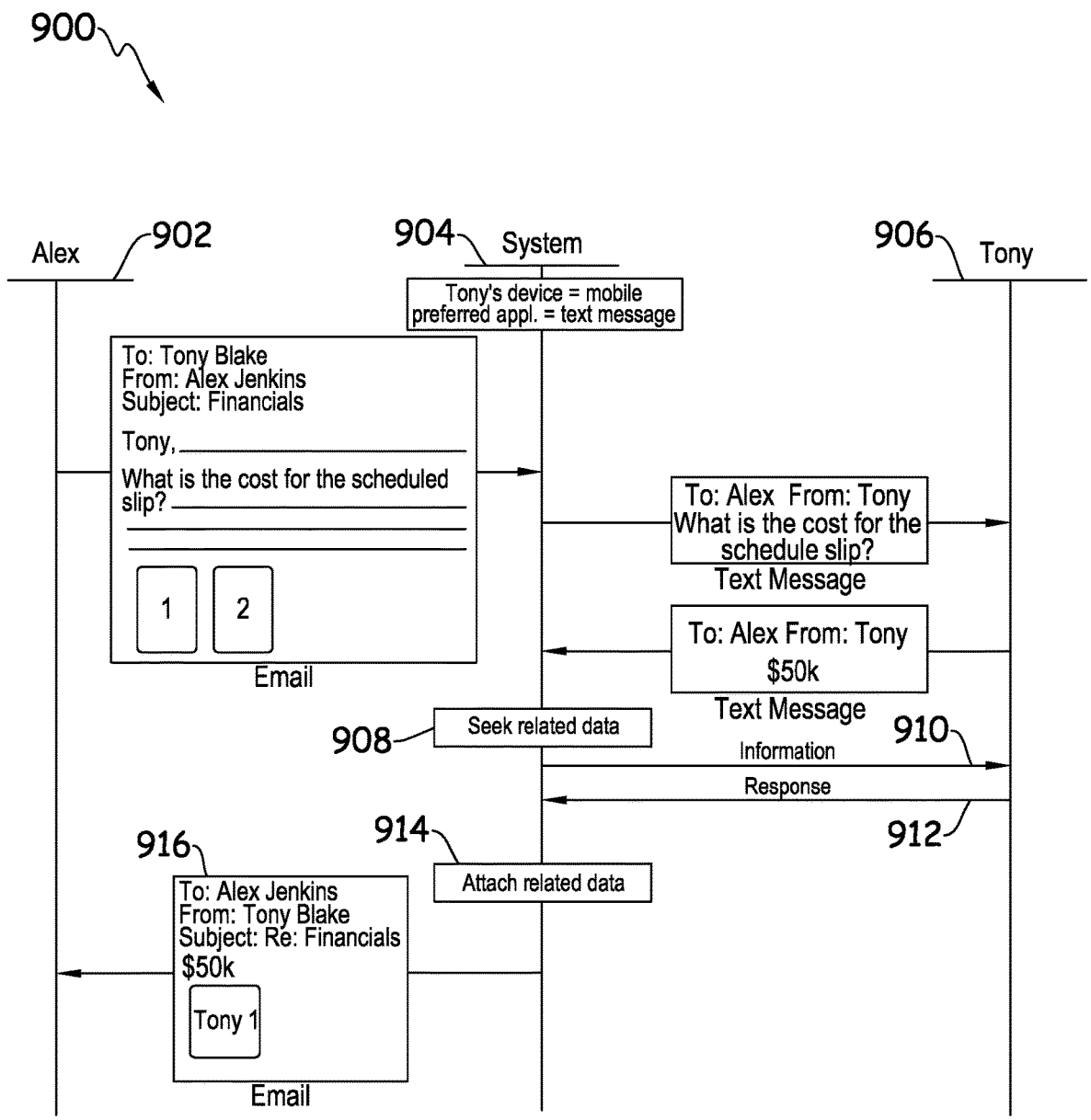
FIG. 9 illustrates an example scenario depicting the attachment of documents.

FIG. 9 is a flow of one implementation of the current application 900. In this example, the system 904, upon receiving a reply text message from the recipient 906 seeks the recipient's data and finds a related document 908, wherein the related design is further disclosed herein.

If at least one related document is found, the system 904 sends a message to the recipient 906 wherein a button is provided, allowing the user to decide to attach a document or file to the outgoing message (not depicted). A message is sent to the recipient, such as an information message 910 containing the document name(s). The client device of the recipient 906 displays the data in the information message via a popup window, as depicted in FIG. 10.

Figure 10:
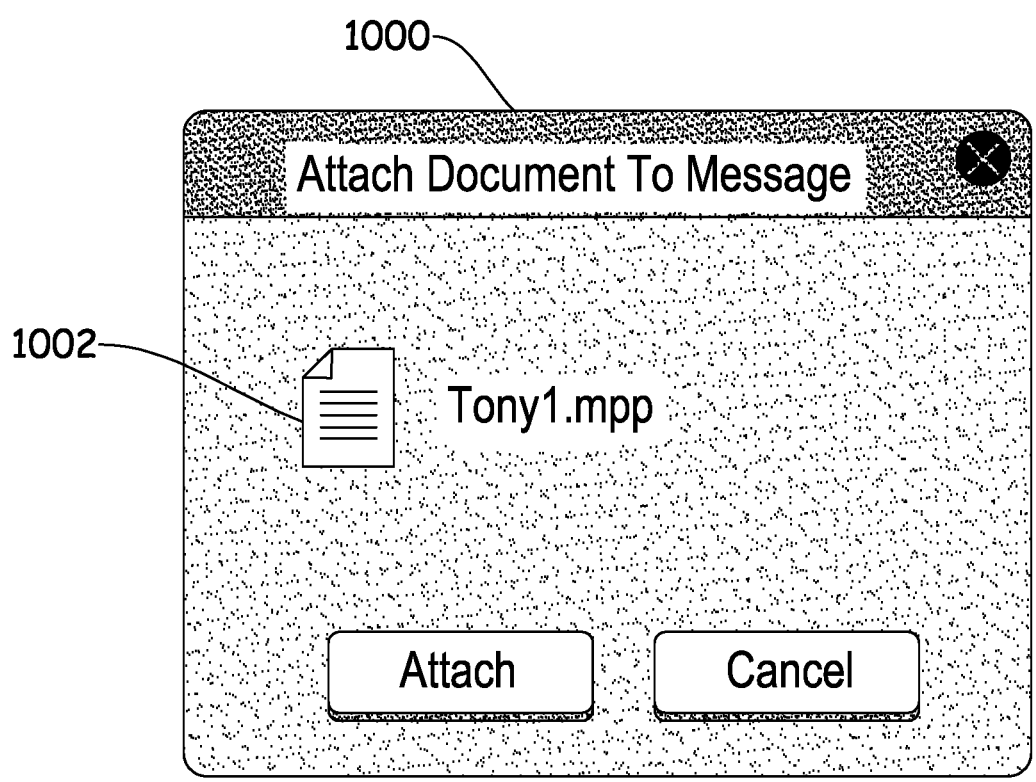
FIG. 10 illustrates an example scenario depicting a pop up window displaying the attachment of documents.

FIG. 10 is a GUI screenshot in one implementation of the current application 1000 showing a popup window component. The window displays the data containing in an incoming message, for example the information message 906, as displayed in FIG. 9.

The document is listed 1002 wherein, in an alternating embodiment, either the document icon, or the document title may be clicked via the pointing device of the user such that the contents of the document is displayed on the client device of the user 906, as displayed in FIG. 9.

Referring to FIG. 9, two buttons allow for interaction with the window. An "Attach" button, when clicked informs the application that the document is to be attached. This sends a response message 912 to the system 904 with data indicating that the attachment is to be attached. A second button "Cancel", when clicked informs the application that the document is not to be attached in the response message sent back to the system.

Upon reception of the response message 912, the system either attaches the document (Tony 1) 914 or not according the received data in the response message.

The system forwards the message 916, converting it to an email as the originator of the first message 902 has a preferred application of email wherein the process of converting the message is further disclosed herein.

In one embodiment, to programmatically add an attachment to an email, the following Google API code provides one method:

```
Properties props=new Properties( );
Session session=Session.getDefaultInstance(props, null);
MimeMessage email=new MimeMessage(session);
InternetAddress tAddress=new InternetAddress("to@to.in");
InternetAddress fAddress=new InternetAddress("from@from.in");
email.setFrom(fAddress);
email.addRecipient(javax.mail.Message.RecipientType.TO, tAddress);
email.setSubject("subject");
MimeBodyPart mimeBodyPart=new MimeBodyPart( );
mimeBodyPart.setContent("thebody", "text/plain");
mimeBodyPart.setHeader("Content-Type", "text/plain; charset=\"UTF-8\"");
Multipart multipart=new MimeMultipart( );
multipart.addBodyPart(mimeBodyPart);
mimeBodyPart=new MimeBodyPart( );
DataSource source=new
FileDataSource("C:\\Users\\Downloads\\Tony1.mpp");
mimeBodyPart.setDataHandler(new DataHandler(source));
mimeBodyPart.setFileName("Tony1.mpp");
String contentType="application/mpp";
mimeBodyPart.setHeader("Content-Type", contentType+"; name=\""+"test.pdf"+"\"");
mimeBodyPart.setHeader("Content-Transfer-Encoding", "base64");
multipart.addBodyPart(mimeBodyPart);
email.setContent(multipart);
email.writeTo(System.out);
ByteArrayOutputStream bytes=new ByteArrayOutputStream( );
email.writeTo(bytes);
String encodedEmail=
Base64.encodeBase64URLSafeString(bytes.toByteArray( ));
Message message=new Message( );
message.setRaw(encodedEmail);
Draft draft=new Draft( );
draft.setMessage(message);
draft=new Gmail(new NetHttpTransport( ), new JacksonFactory( ),
getCredential( )).users( ).drafts( ).create("me", draft).execute( );
```

The code above allows for a document to be attached programmatically to an outgoing email. The document to be attached is stored in a object "source" of type DataSource, the file is "C:\\Users\\Downloads\\tony1.mpp".

A new DataHandler is created from the source object and loaded into the message (mimeBodyPart). The mimeBodyPart is placed into the outgoing message via a call to setContent, and the email is sent (email.writeTo(System.out)).

Document Attachment Actions

In another embodiment of the current application, the system 104 may send a message to a recipient of a composing message when a document is attached. The attached document is analyzed and a message may go to at least one of the recipients based on the recipient's preferred application and device.

Figure 11:
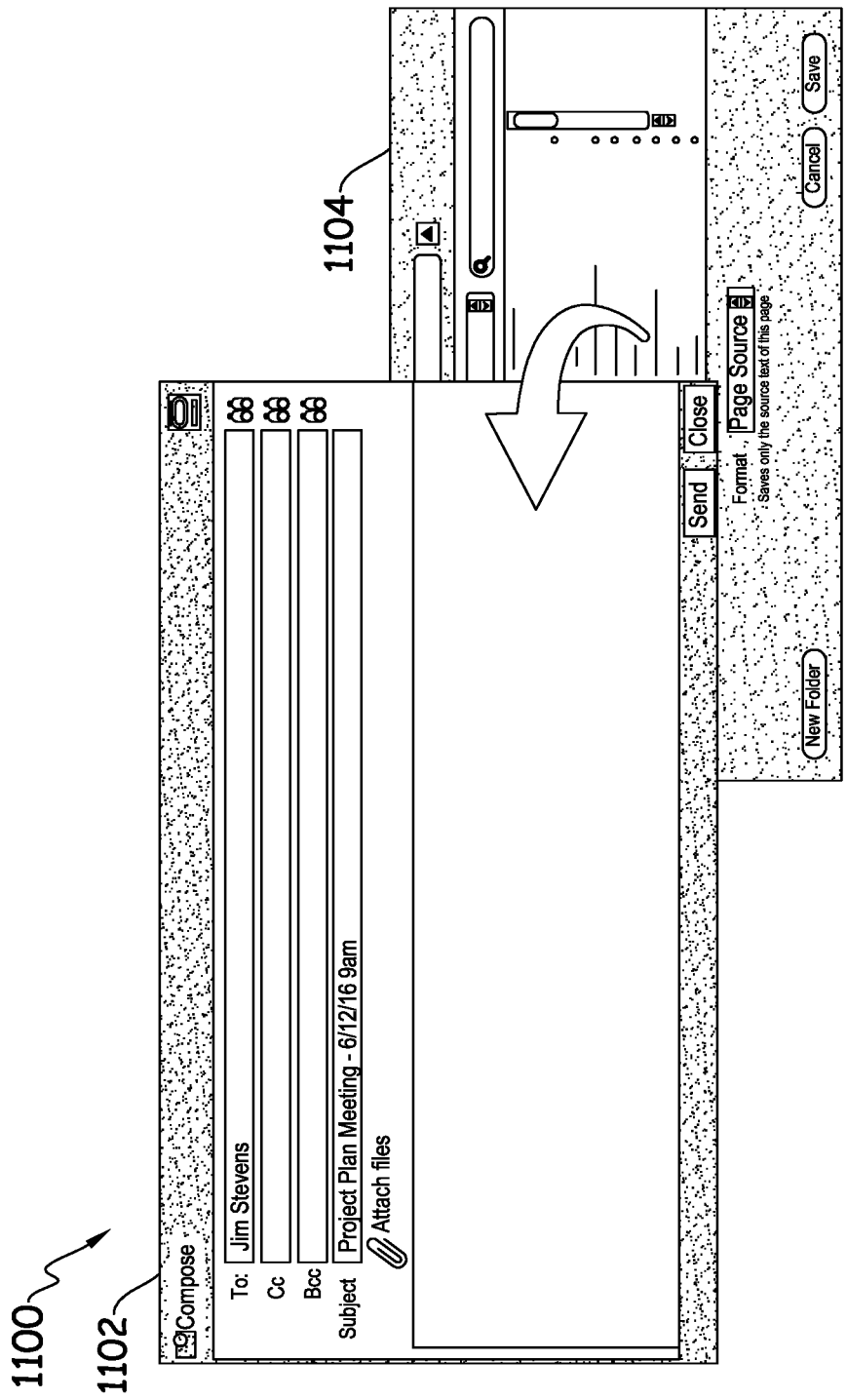
FIG. 11 depicts an example scenario depicting a GUI screen shot of attaching a document to a message.

FIG. 11 shows a GUI of a message composition, and the adding of an attachment to the message 1100. A message being composed 1102 may contain attachment files. These files may be added to the message via a drag-and-drop method wherein a file in a file selection window 1104 is selected via a pointing device such as a user's mouse pointer or finger, and drug over the message composition window 1102 and released wherein the message application executes logic to attach the file to the composed message.

Figure 12:
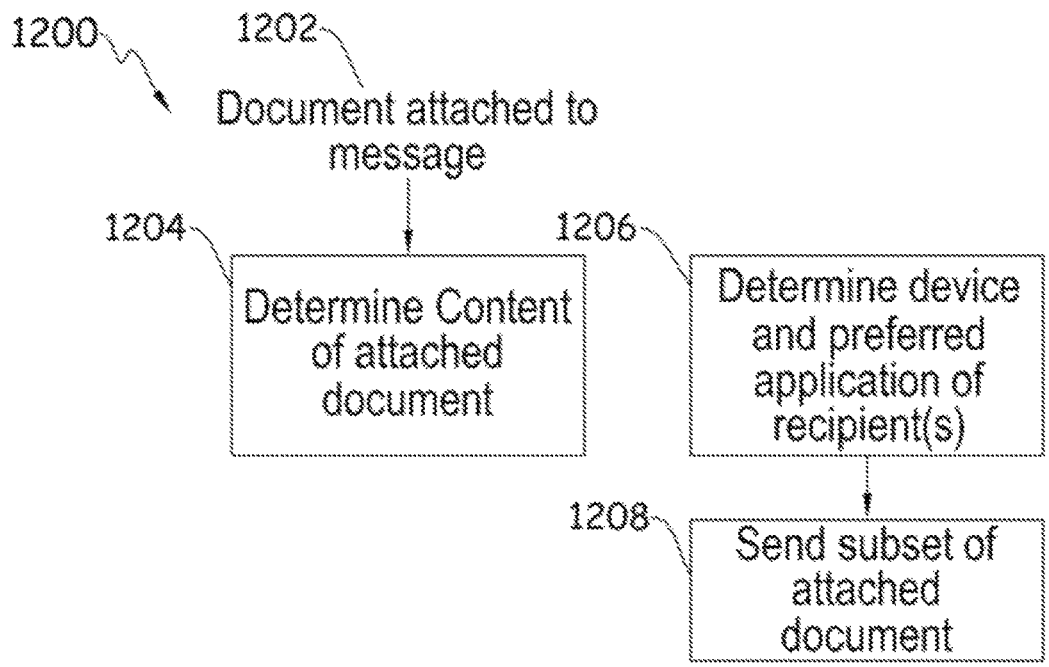
FIG. 12 depicts a flow chart illustrating the actions taken by the system when attaching documents.

FIG. 12 is a flowchart 1200 of processing on a file that has been attached to a message 1202. The content of the message is first determined 1204 followed by determining the preferred application and device of the recipient(s) 1206. Finally, a subset of the attached document is sent to the recipient(s) 1208. Each of the steps are further described below.

Determining Content of Attached Messages

The attached file is obtained and analyzed to obtain the content of the file 1204. The analysis will provide key elements of the file. Once a file is attached to a document, the attachment can be obtained via a call to messages.attachments.get( ) which will return the attachment content. The following Java code is used to obtain attachment(s) in a Google mail message:

```
public static void getAttachments(Gmail service, String userId, String messageId)
    throws IOException{
    Message message=service.users( ).messages( ).get(userId, messageId).execute( );
    List<MessagePart>parts=message.getPayload( ).getParts( );
    for (MessagePart part:parts) {
        if (part.getFilename( )!=null && part.getFilename( ).length( )>0) {
            String filename=part.getFilename( );
            String attId=part.getBody( ).getAttachmentId( );
            MessagePartBody attachPart=service.users( ).messages( ).attachment( ).
                get(userId, messageId, attId).execute( );
            Base64 base64Url=new Base64(true);
            byte[ ] fileByteArray=base64url.decodeBase64(attachPart.getData( ));
```

```
        FileOutputStream fileOutFile=
           new    FileOutputStream("directory_to_store_at-
              tachments"+filename);
        fileOutFile.write(fileByteArray);
        fileOutFile.close( );
      }
   }
}
```

The attachments are stored in a fileOutFile of type FileOutputStream wherein the files may be analyzed by the system 104.

Once obtaining the attached files, it is possible to perform analysis on the files to determine content. When processing a document, such as an attachment to an outgoing message, tools are available that process the document and allow processing on the contents of the data in the document. For example, utilizing a tool such as the Docotic .NET library for PDF document processing where existing documents can be analyzed. For example, the following example shows how to extract text from an entire PDF document:

```
using System.Diagnostics;
using System.IO;
namespace BitMiracle.Docotic.Pdf.Samples {
   public static class ExtractText {
      public static void Main( ) {
         using   (PdfDocument   pdf=new   PdfDocument
            ("Sample data/jfif3.pdf"))
         {
            // Extract plain text from document
            string documentTextFile="Document text.txt";
              using (StreamWriter writer=new StreamWriter
                 (documentTextFile))
              writer.Write(pdf.GetText( ));
            Process.Start(documentTextFile);
            // Extract text with formatting from document
            string   documentTextFormattedFile="Document
              text with formatting.txt";
            using (StreamWriter writer=new StreamWriter
              (documentTextFormattedFile))
                writer.Write(pdf.GetTextWithFormatting( ));
            Process.Start(documentTextFormattedFile);
            // Extract plain text from first page
            string firstPageTextFile="First page text.txt";
            using (StreamWriter writer=new StreamWriter
              (firstPageTextFile))
                writer.Write(pdf.Pages[0].GetText( ));
            Process.Start(firstPageTextFile);
         }
      }
   }
}
```

In another embodiment, the tool Natural Language Toolkit (NLTK) is utilized to perform analysis on a file to determine keyword(s), key phrase(s), and/or key sentence(s). NLTK provides a pool of language processing tools written in the Python language, including data mining, machine learning, data scraping, sentiment analysis and other various language processing tasks. Further analysis of the NLTK is detailed herein.

Determining Recipient Device and Preferred Application

After the message is analyzed, the device and preferred application of each recipient is determined 1208 of which has been previously disclosed herein. The process to determine the type of device of a recipient is further disclosed herein and is not repeated here. For further information on determining the device of a recipient, please refer to the description herein. As previously disclosed herein, if the message format does not match the recipient's device and/or preferred application, the message is converted to match the preferred application of the recipient. The conversion of said message is further disclosed herein.

Sending a Subset of the Attached Document

Having access to the analysis of the at least one attached file to a composing message, and having obtained the device and the preferred application of the at least one recipient, processing is preformed at the system 104 to send at least one message to at least one recipient of the composing message.

Example

User A is composing a message and inputs User B and User C as recipients of the message. The user then drags a document entitled "Project Plan 2015.pdf" into the message. The current application obtains access to the Project Plan 2015.pdf file and through analysis retrieves the text:

"Through the analysis of the Alpha project in the $2^{nd}$ half of the year, it is apparent that the headcount should be increased by 5 people. This increase should be in software development, and more specifically 2 in test and 3 in development."

The User B is determined to be using a mobile device wherein the preferred application is found to be text messaging. Therefore, the retrieved text is sent to User B.

Recipient Based Message Delivery

In another embodiment, message delivery is altered based on which recipient should receive which content in the original message. This is in contrast to what normally happens in normal message delivery: a message (i.e. email) is sent to at least one recipient wherein each recipient is sent the same message. This occurs even if a recipient of the message is not particularly interested in the entire message.

The current application seeks to send portions of the message to those at least one recipients wherein the portion of the message mostly pertains to that recipient.

Figure 13:
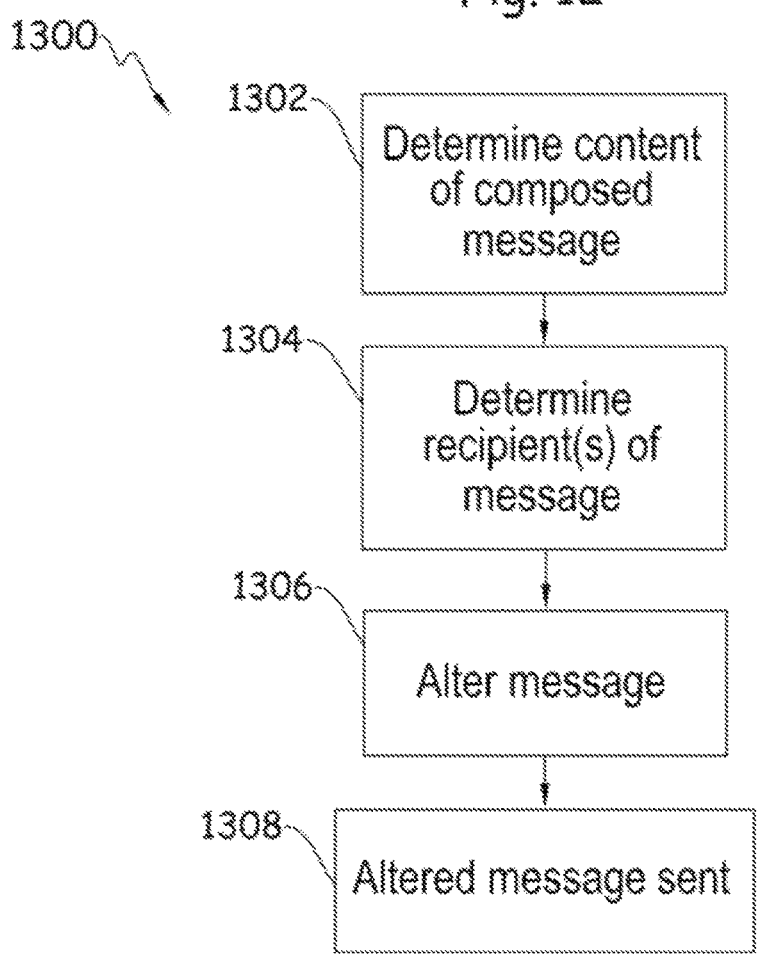
FIG. 13 depicts a flow chart of a recipient based message delivery in one embodiment of the system.

The flowchart in FIG. 13 depicts the flow of processing in determining the message content and deriving the interest of the recipient(s) of the message.

FIG. 13 shows a flowchart 1300 of the processing occurring to determine content of the message to send to recipient(s).

Firstly, the content of the composed message is determined, 1302. The message may be an email message, an SMS message, an IM message, or any other message composed on a device 108, for example a mobile device.

Furthermore, the determining logic 1304, 1306 is performed by the system wherein the system may reside in the originator's client device, such as 108, may reside in the system element 104, or may reside in any other element of the architecture containing a processor and memory. Once the message has been altered, it is further sent out to the recipient, 1308.

Determine Content of Composed Message

A message is composed utilizing the current application where the body of the message is entered. For an email for example, this is the body of the message. The body of the message is obtained by the system 104. To obtain the body of an email, the following code may be utilized:

```
System.out.println(StringUtils.newStringUtf8
   (Base64.decodeBase64(gmailMessage.  payload.parts
      [0].body.data)));
```

The body of the email will be returned in the "parts" part of the payload. For example, in Javascript, the following logic is used to obtain the body of the message:

a. Traverse the payload.parts and check if it contains a part that has the body of the message (searching for either "text/plain" or "text/html").
b. Do step 1 again, but this time with the parts found inside the parts encountered, recursively. The body will eventually be encountered.

Once the body of the message is obtained, it is possible to then analyze the text. The analysis of the text is further disclosed herein and is not repeated here. The analysis of the text (via tools such as NLTK) obtains key elements of the text. These key elements are then utilized in the future steps.

Determine Recipients

The recipients are obtained by the system 104 via methods described above. The details of the recipient(s) of the message are then obtained via interactions with data in an enterprise, such as SharePoint data. In the following example, the following code obtains the job title from SharePoint data from Active Directory:

```
protected getADUserInfo( )
{
    Directory Searcher dsearcher=null;
    string jobTitle=string.Empty;
    DirectoryEntry dentry=new DirectoryEntry( );
    DirectoryEntry de=new DirectoryEntry( );
    dentry.Path="your AD ldap path";
    dentry.Username="*****\\domain;";
    dentry.Password="******";
    Directory Searcher dsearcher=new DirectorySearcher
        (dentry);
    dsearcher.Filter=String.Format("(&
        (ObjectCategory=Person) (sAMAccountName="+
        LoginName+"))");
    SearchResult searchResult=dsearcher.FindOne( );
    de=searchResult.GetDirectoryEntry( );
    if (searchResult!=null)
    {
        if (de.Properties.Contains("title"))
        {
            jobTitle=de.Properties["title"][0].ToString( );
        }
    }
}
```

The job title will be returned in the string "jobTitle".

Once the job titles of the at least one recipient of the message, the processing continues to match the content of the message to the job title of the recipient. If the key element of the message pertains to the job title of a recipient, a new message is created by the system 104, and the message portion is sent to that recipient via a newly created message in the system.

This helps to ensure that the relevant portions of a message is sent to the at least one recipient of the message.

Although specific embodiments have been illustrated and described herein, a whole variety of alternate and/or equivalent implementations may be substituted for the specific embodiments shown and described without departing from the scope of the present disclosure. This application is intended to cover any adaptations or variations of the embodiments discussed herein.

The invention claimed is:

1. A method comprising:
receiving, by a computer device, a message, in a first format, from a first user device, the message intended for receipt by second user device;
identifying, by the computer device, a type of the second user device;
identifying, by the computer device, a preferred application to receive messages in a second format, different than the first format, on the second user device, the preferred application selected by a user of the second user device from a plurality of different application messaging options corresponding to the second user device;
identifying, by the computer device, that the preferred application is currently active on the second user device based on a manual operation performed after the second user device has been turned on;
generating, by the computer device, a converted message by converting the message from the first format to the second format;
transmitting, by the computer device, the converted message to the preferred application of the second user device determined to currently be in use;
receiving, by the computer device, and in response to the message from the first user device, a reply message from the second user device, the reply message identifying the user of the second user device;
identifying, via the computer device, a use of a third user device associated with the user, the third user device being of a different type than the type of the second user device; and
sending, by the computer device, both the converted message, and the reply message, to the third user device.

2. The method of claim 1, wherein the identifying the type of the second user device further comprises:
detecting a previous incoming message to the second user device;
identifying a time frame to respond to the message; and
selecting the second user device based upon a comparison of the time frame to an amount of time for the user of the second device to respond to the message.

3. The method of claim 1, wherein the identifying the second format further comprises:
identifying the second format based upon a profile associated with the user of the second user device.

4. The method of claim 1, wherein the identifying the second format further comprises:
identifying the second format based upon a frequency of use of the preferred application.

5. The method of claim 1, wherein the identifying the second format further comprises:
identifying the second message format based upon auto-discovery of the preferred application.

6. The method of claim 1, wherein the generating the converted message further:
analyzing and extracting keywords from the message.

7. The method of claim 1, further comprising:
identifying the user of the second user device based on at least one of:
information obtained via interactions with data in a network; and
information in a stored profile associated with the user.

8. The method of claim 1, further comprising:
activating a timer after receipt of the message by the second user device;
determining whether the message has been opened during a period of time measured by the timer; and
transmitting the converted message to the preferred application of the second device when the period of the timer expires and a determination is made that the message has not been opened during the period of time.

9. The method of claim 1, further comprising:
obtaining information indicative of a job title of the user of the second device; and
determining if one or more keywords of the incoming message pertain to the information indicative of the job title of the recipient.

10. A computer device, comprising:
a memory to store instructions; and
a processor that executes the instructions to:
receive an incoming message, in a first format, from a first user device, the message intended for receipt by a second user device,
identify a type of the second user device,
identify a preferred application to receive messages in a second format, different than the first format, on the second user device, the preferred application selected by a user of the second user device from a plurality of different application messaging options corresponding to the second user device,
identify that the preferred application is currently active on the second user device based on a manual operation performed after the second user device has been turned on,
generate a converted message by converting the incoming message from the first format to the second format; and
transmit the converted message to the preferred application of the second user device determined to currently be in use,
receive, in response to the message from the first user device, a reply message from the second user device, the reply message identifying the user of the second user device,
identify a use of a third user device associated with the user, the third user device being of a different type than the type of the second user device, and
send both the converted message, and the reply message, to the third user device.

11. The computer device of claim 10, wherein, when the processor is to identify the type of the second user device, the processor further is to:
detect a previous incoming message to the second user device;
identify a time frame used to respond to the previous incoming message; and
select the second user device based upon a comparison of the time frame to an amount of time for the user of the second device to respond to the message.

12. The computer device of claim 10, wherein, when the processor is to identify the second format, the processor further is to:
identify the second format based on a profile associated with the user of the second user device.

13. The computer device of claim 10, wherein, when the processor is to identify the second format, the processor further is to:
identify the second format based on a frequency of use of the preferred application of the second user device.

14. The computer device of claim 10, wherein, when the processor is to identify the second format, the processor further is to:
identify the second format based on auto-discovery of the preferred application of the second user device.

15. The computer device of claim 10, wherein, the processor is to generate the converted message, the processor further is to:

analyze and extract keywords from the message the software agent is configured to determine at least one recipient of the incoming message based on information a profile corresponding to the at least one recipient.

16. The computer device of claim 10, wherein the processor further is to:
identify the user of the second user device based on at least one of:
information obtained via interactions with data in a network; and
information in a stored profile associated with the user.

17. The computer device of claim 10, wherein processor further is to:
activate a timer after receipt of the message by the second user device:
determine whether the message has been opened during a period of time measured by the timer; and
transmit the converted message to the preferred application of the second device when the period of the timer expires and a determination is made that the message has not been opened during the period of time.

18. The computer device of claim 10, wherein processor further is to:
obtain information indicative of a job title of the user of the second device; and
determine if one or more keywords of the incoming message pertain to the information indicative of the job title of the recipient.

19. A non-transitory computer readable medium encoded with computer program instructions that when executed by one or more processors cause the one or more processors to perform:
receiving a message, in a first format, from a first user device, the message intended for receipt by a second user device;
identifying a type of the second user device;
identifying a preferred application to receive messages in a second format, different than the first format, on the second user device, the preferred application selected by a user of the second user device from a plurality of different application messaging options corresponding to the second user device;
identifying, that the preferred application is currently active on the second user device based on a manual operation performed after the second user device has been turned on;
generating a converted message by converting the message from the first format to the second format;
transmitting the converted message to the preferred application of the second user device determined to currently be in use;
receiving, in response to the message from the first user device, a reply message from the second user device, the reply message identifying the user of the second user device;
identifying a use of a third user device associated with the user, the third user device being of a different type than the type of the second user device; and
sending both the converted message, and the reply message, to the third user device.

20. The non-transitory computer readable medium of claim 19, wherein the identifying the type of the second user device further comprises:
detecting a previous incoming message to the second user device;
identifying a time frame to respond to the message; and selecting the second user device based upon a comparison of the time frame to an amount of time for the user of the second device to respond to the message.

\* \* \* \* \*